(12) United States Patent
Nakanishi et al.

(10) Patent No.: US 8,087,790 B2
(45) Date of Patent: Jan. 3, 2012

(54) PROJECTOR

(75) Inventors: Sei Nakanishi, Matsumoto (JP); Yasushi Tateno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 365 days.

(21) Appl. No.: 12/539,184

(22) Filed: Aug. 11, 2009

(65) Prior Publication Data

US 2010/0045947 A1 Feb. 25, 2010

(30) Foreign Application Priority Data

Aug. 21, 2008 (JP) .................................. 2008-212815

(51) Int. Cl.
*G03B 21/14* (2006.01)
(52) U.S. Cl. .............. 353/119; 353/63; 353/65; 353/79; 353/122; D16/225; D16/231; D16/234
(58) Field of Classification Search ............ 353/63, 353/65, 79, 119, 122; D16/225, 231, 234; 248/121, 126, 371, 393, 398, 346.01, 346.04, 248/351, 127, 439, 436, 176.1; 352/242, 352/243
See application file for complete search history.

(56) References Cited

U.S. PATENT DOCUMENTS

| D420,376 S | * | 2/2000 | Iwabuchi et al. | ............ D16/231 |
| 7,108,382 B2 | * | 9/2006 | Oross | ............ 353/119 |
| 7,658,498 B2 | * | 2/2010 | Anson | ............ 353/69 |
| 7,901,084 B2 | * | 3/2011 | Willey et al. | ............ 353/49 |
| 2003/0234335 A1 | * | 12/2003 | Umberg | ............ 248/551 |
| 2005/0041221 A1 | * | 2/2005 | Buroni | ............ 353/119 |
| 2005/0140941 A1 | * | 6/2005 | Maddock | ............ 353/119 |

FOREIGN PATENT DOCUMENTS

| JP | U-56-100337 | 12/1979 |
| JP | U-62-107485 | 7/1987 |
| JP | A-9-326569 | 12/1997 |
| JP | A-11-258695 | 9/1999 |
| JP | A-2004-272093 | 9/2004 |

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

A projector includes: an outer housing; and a plurality of handles provided on an upper surface of the outer housing to hold the projector, wherein each of the handles includes a pair of attachment members standing on the upper surface, and a grip member connected with the pair of the attachment members and extended substantially in parallel with the upper surface.

7 Claims, 11 Drawing Sheets

PROJECTOR

CROSS REFERENCE TO RELATED APPLICATIONS

The present application claims priority from Japanese Patent Application No. 2008-212815 filed on Aug. 21, 2008, which is hereby incorporated by reference in its entirety.

BACKGROUND

1. Technical Field

The present invention relates to a projector.

2. Related Art

Currently, a projector of a type used for various purposes in various environments such as presentation in meetings, academic meetings, and exhibitions is carried into presentation rooms or the like. For improving portability, a projector provided with a handle has been proposed (for example, see JP-A-2004-272093).

However, the following problem arises from a projector which is heavy and adopts the technology disclosed in JP-A-2004-272093.

The handle of the projector shown in JP-A-2004-272093 is held by only one hand. In this case, a user of the projector is required to carry the heavy projector by himself or herself. Thus, portability of the projector still needs to be increased.

SUMMARY

It is an advantage of some aspects of the invention to provide a projector having high portability.

A projector according to an aspect of the invention includes: an outer housing; and a plurality of handles provided on an upper surface of the outer housing to hold the projector. Each of the handles include a pair of attachment members standing on the upper surface, and a grip member connected with the pair of the attachment members and extended substantially in parallel with the upper surface.

According to this structure including the plural handles, the user can carry the projector not by himself or herself but with plural persons. Thus, portability of the projector improves.

In case of a projector attached to the ceiling such that the upper surface is located on the upper side to project image light downward, for example, the handles are disposed on the upper surface. In this case, the projector can be attached to the ceiling with the handles held by the user at the time of attachment of the projector to the ceiling. Thus, working efficiency improves.

It is preferable that the plural handles are disposed substantially in parallel with each other.

According to this structure, the plural handles are disposed in parallel with each other. Thus, a suspension fitting for attachment to the ceiling can be attached to the grip member of this structure in the horizontal direction in a stable condition, for example. Moreover, the distance between the suspension fitting and the ceiling can be reduced.

It is preferable that a pair of projections which project while curving in the longitudinal direction of the grip member are provided on the inner side of the grip member. In this case, the pair of projections are curved in directions away from each other.

The "inner side" of the grip member herein refers to the side of the grip member opposed to the upper surface.

According to this structure, the projections are curved in directions away from each other. Thus, the user can easily put the fingers along the projections for gripping the handles, and can carry the projector in a stable condition.

Moreover, the user can put the fingers along the projections provided as a pair of components according to his or her preference even when the user grips the handles by the opposite hand or changes the direction of the hand. Thus, portability of the projector improves.

It is preferable that an asperity portion which wavelikely processed in the longitudinal direction of the grip member is provided on the inner side of the grip member.

According to this structure including the wavelike asperity portion on the inside of the grip member, the user can fit the fingers along the asperity portion. Thus, the user can easily grip and carry the handles in a stable condition.

Moreover, the user can put the fingers along the wavelike asperity portion provided in the longitudinal direction of the grip member according to his or her preference even when the user grips the handle by the opposite hand or changes the direction of the hand. Thus, portability of the projector improves.

It is preferable that a projected rim portion having the center which forms roundly expanded in the quaquaversal and extending in the longitudinal direction of the grip member is provided on the inner side of the grip member.

According to this structure including the projected rim portion having the roundly expanded quaquaversal-shaped center and extending in the longitudinal direction on the inner side of the grip member, the user can easily fit the folded fingers along the projected rim portion. Thus, the user can grip the handles in a stable condition.

Moreover, the user can put the fingers along the projected rim portion provided in the longitudinal direction of the grip member according, to his or her preference even when the user grips the handle by the opposite hand or changes the direction of the hand similarly to the second and third embodiments. Thus, portability of the projector improves.

It is preferable that a part of the grip member is extruded from the side of the outer housing.

According to this structure including the grip member extruded from the side of the outer housing, the user can carry the projector without contact between the outer housing and the user's body.

It is preferable that the grip member includes: a cylindrical shaft which extends in the direction of the grip member; and a grip member main body which rotatably formed around the shaft.

According to this structure, the grip member main body can rotatably formed around the shaft. Thus, the user can rotate the grip member main body at the time of attachment to the ceiling without switching the hand for gripping the handle to the opposite hand or changing the direction of the hand. Thus, working efficiency improves.

BRIEF DESCRIPTION OF THE DRAWINGS

The invention will be described with reference to the accompanying drawings, wherein like numbers reference like elements.

DESCRIPTION OF EXEMPLARY EMBODIMENTS

A first embodiment of the invention is hereinafter described with reference to the drawings.

First Embodiment

External Appearance of Projector

Figure 1:
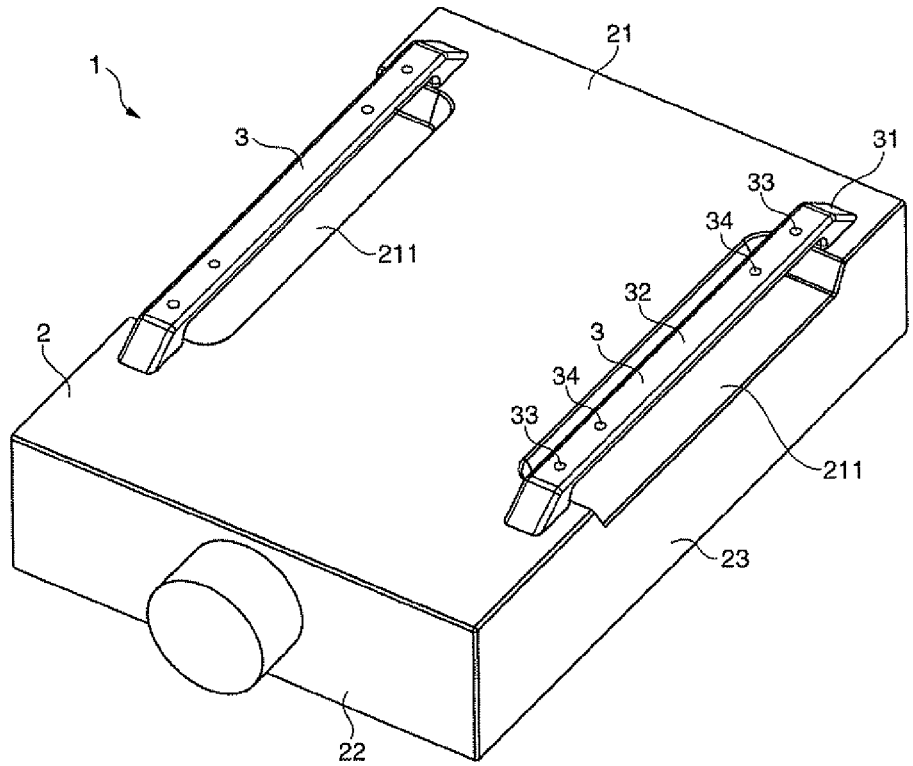
FIG. 1 is a perspective view of a projector according to a first embodiment of the invention.

FIG. 1 is a perspective view of the front side of a projector 1 as viewed from above according to this embodiment.

In the following explanation, the "up", "down" "left" and "right" correspond to the up, down, left, and right in FIG. 1. Also, the "front surface" and "back surface" in the following explanation correspond to the front surface and the back surface in FIG. 1.

The projector 1 forms image light by modulating lights emitted from a light source according to image information, and expands and projects the image light thus formed on a screen (not shown).

The projector 1 is suspended from the ceiling or the like to expand and project the image light downward toward the front.

As illustrated in FIG. 1, the projector 1 generally includes an outer housing 2 constituting the outer case, and handles 3 to be held by a user for carrying the projector 1.

The outer housing 2 is made of synthetic resin, and has substantially rectangular parallelepiped shape constituted by an upper surface 21, a front surface 22, a right side surface 23 and the like as illustrated in FIG. 1. The handles 3 attached to the outer peripheries of the upper surface 21 (peripheries of right side surface and left side surface) extend from the back surface to the front surface substantially in parallel with each other. Concaves 211 are formed at positions of the upper surface 21 corresponding to the handles 3. In this structure, the user can easily grip the handles 3 without contact between his or her fingers with the outer housing 2.

Structure of Handle

Figure 2:
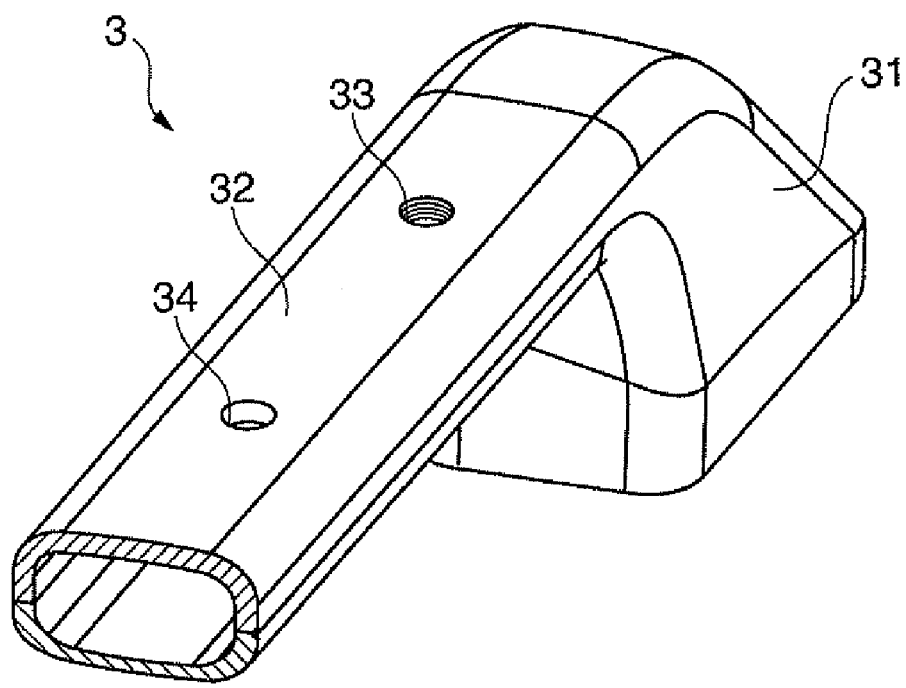
FIG. 2 illustrates a handle a part of which is cut away according to the first embodiment.

FIG. 2 illustrates one of the handles 3 a part of which is cut away.

As illustrated in FIGS. 1 and 2, the handle 3 includes a pair of attachment members 31 standing on the upper surface 21, and an approximately U-shaped grip member 32 having both ends connected with the ends of the respective attachment members 31 and extending substantially in parallel with the upper surface 21.

The handle 3 further includes a pair of screw holes 33 symmetric with respect to both end edges, and a pair of symmetric through holes 34 at positions shifted toward the center of the grip member 32 from the screw holes 33.

The grip member 32 is a component to be held by the hand of the user, and has substantially quadrangular cylindrical shape as illustrated in the cross-sectional view of the handle 3 in FIG. 2. The outer side of the grip member 32 has a flat surface.

The screw holes 33 are screw holes provided for attaching a suspension fitting 4. The through holes 34 are holes into which metal wire 5 (FIG. 3) is inserted for more rigidly fixing the projector 1 to the ceiling.

Figure 3:
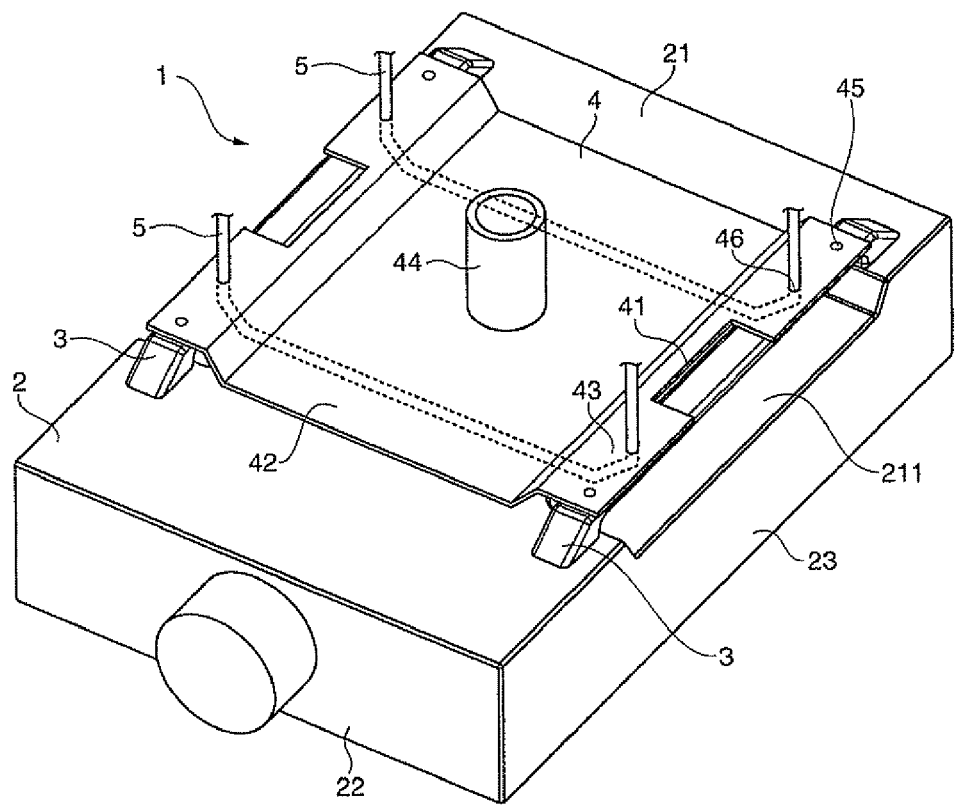
FIG. 3 is a perspective view illustrating a condition in which a suspension fitting is attached to the projector according to the first embodiment.

FIG. 3 is a perspective view showing the projector 1 to which the suspension fitting 4 is attached.

The suspension fitting 4 is a plate-shaped member made of metal, and has a pair of notches 41 formed on parts of both sides, a concave portion 42 concaved toward the center from both sides, and outer edges 43 formed on the horizontal surface. A cylindrical pipe 44 is provided approximately at the center of the concave portion 42. Screw holes 45 are formed at the four corners of the suspension fitting 4 at positions corresponding to the screw holes 33 of the handles 3. Through holes 46 through which the wire 5 is inserted are formed in the vicinity of the screw holes 45 at positions corresponding to the through holes 34 of the handles 3.

According to this structure, the user positions the concave portion 42 of the suspension fitting 4 between the handles 3 to bring the outer edges 43 into contact with the grip members 32. Then, the screw holes 45 of the suspension fitting 4 and the screw holes 33 of the handles 3 are aligned, and attached by screws for fixing.

Then, the user inserts the wire 5 into the through holes 46 of the suspension fitting 4 and the through holes 34 of the handles 3 such that the wire 5 extends between the handles 3 as illustrated in FIG. 3.

Finally, the user fits the pipe 44 to a supporting member (not shown) provided on the ceiling by gripping the handles 3 exposed through the notches 41 of the suspension fitting 4, and inserts the wire 5 into holes (not shown) provided on the ceiling to attach the projector 1 to the ceiling.

According to the first embodiment, the following advantages can be provided.

Since the handles 3 provided as plural components can be held by the plural users, portability of the projector 1 improves.

Since the plural handles 3 are provided on the upper surface 21 of the outer housing 2, the user can attach the projector 1 to the ceiling while gripping the handles 3.

By insertion of the wire 5 into the through holes 34 on the handles 3 and the through holes 46 on the suspension fitting 4, the projector 1 can be rigidly attached to the ceiling at the time of suspension. Thus, falling of the projector 1 can be prevented. Moreover, by fixing the projector 1 with insertion of the wire 5, both fixing of the projector 1 to the ceiling and prevention of theft of the projector 1 can be achieved.

Each of the grip member 32 has the flat surface, and the two handles 3 are disposed parallel with each other. Thus, the plate-shaped suspension fitting 4 can be attached to the handles 3 in the horizontal direction and in the stable condition.

The concave portion 42 is formed on the suspension fitting 4, and the pipe 44 attached to the concave portion 42 engages with the supporting member on the ceiling. Thus, the projector 1 can be fitted at a position closer to the ceiling. Moreover, by staking the projector 1 on the handles 3 and fixing the projector 1 thereto, stack projection produced by stacking a plurality of projectors in the vertical direction can be achieved without requiring dedicated jigs.

Second Embodiment

Figure 4:
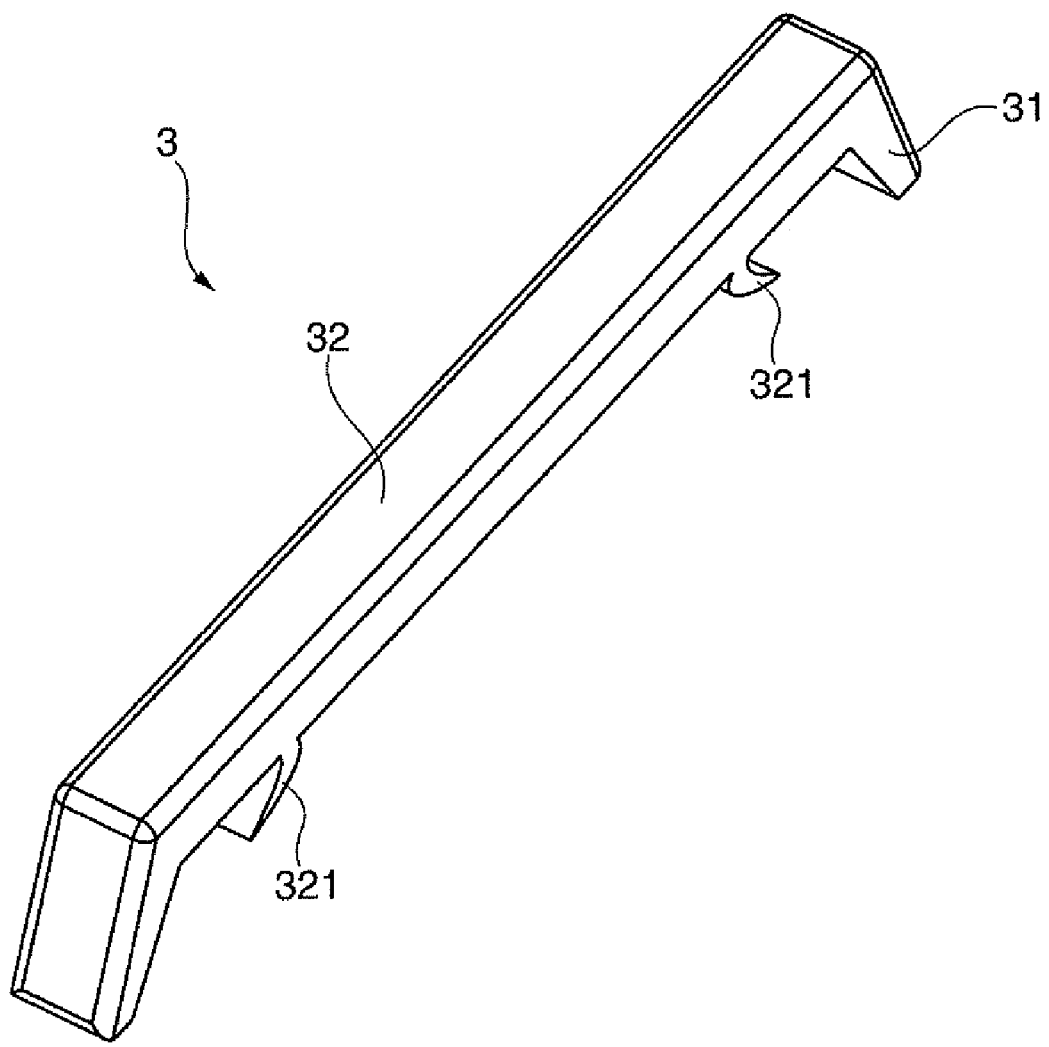
FIG. 4 is a perspective view of a handle according to a second embodiment of the invention.

FIG. 4 is a perspective view illustrating the handle 3 according to a second embodiment of the invention. In the following explanation with reference to the figure, similar reference numbers are given to elements similar to those in the above embodiment, and the same explanation is not repeated. In the following embodiments, only the shape of the grip member 32 of the handle 3 as the chief characteristics of the invention is described, and other structure is not discussed.

According to this embodiment, a pair of projections 321 which project while curving in the extending direction of the grip member 32 are provided on the inner side of the grip member 32 of the handle 3. The projections 321 are curved in directions away from each other.

Since the projection 321 curved in directions away from each other are equipped in this embodiment, the user can easily put the fingers along the projections 321 for gripping the handle 3. Thus, the user can carry the projector 1 in a stable condition.

Moreover, the user can put the fingers along the projections 321 provided as a pair of components according to his or her preference even when the user grips the handle 3 by the opposite hand or changes the direction of the hand. Thus, portability of the projector 1 improves.

Third Embodiment

Figure 5:
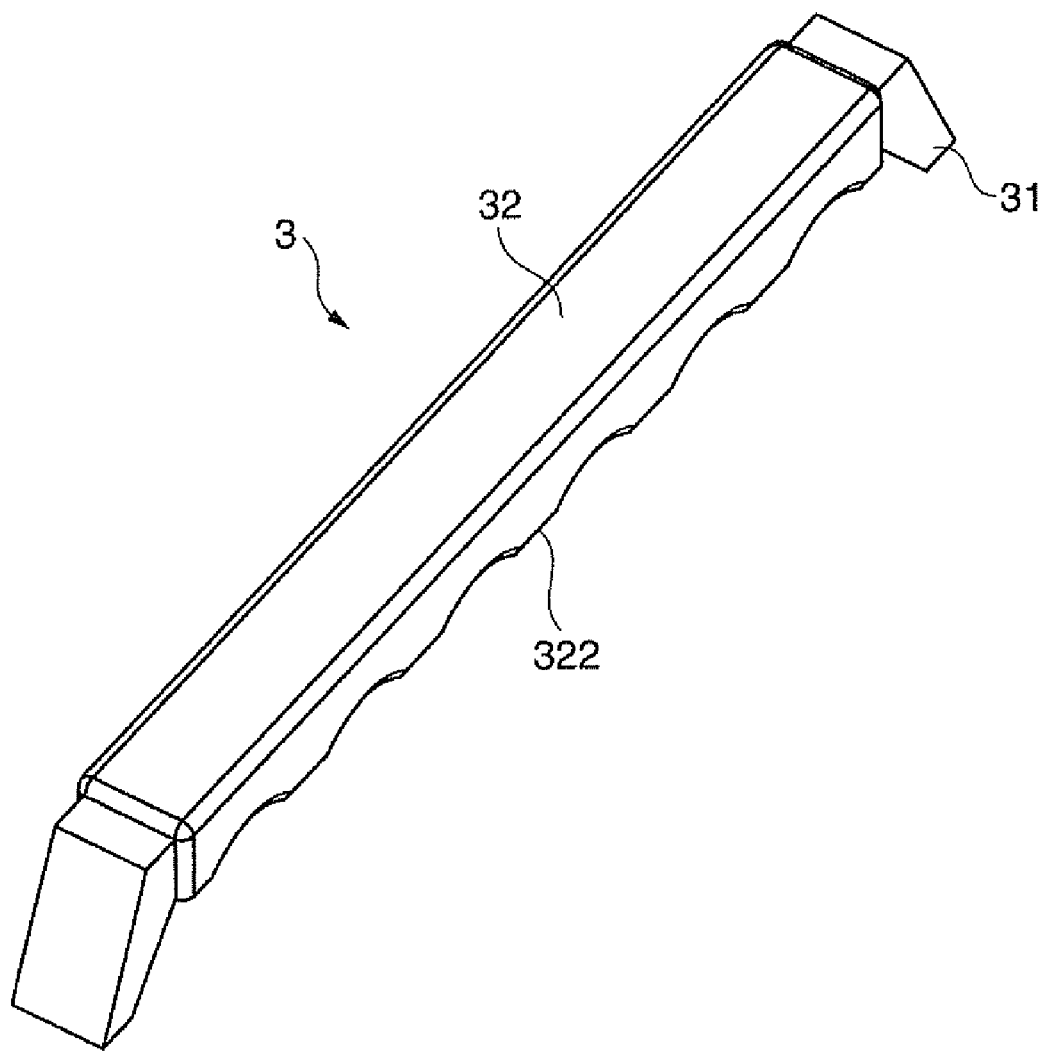
FIG. 5 is a perspective view of a handle according to a third embodiment of the invention.

FIG. 5 is a perspective view of the handle 3 according to a third embodiment of the invention. In the following explanation with reference to the figure, similar reference numbers are given to elements similar to those in the first embodiment, and the same explanation is not repeated.

In this embodiment, an asperity portion 322 which wavelikely processed in the longitudinal direction of the grip member 32 is provided on the inner side of the grip member 32.

Since the wavelike asperity portion 322 is formed on the grip member 32 in this embodiment, the user can fit the fingers along the asperity portion 322. Thus, the user can grip the handle 3 in a stable condition.

Moreover, the user can put the fingers along the asperity portion 322 provided in the longitudinal direction of the grip member 32 according to his or her preference even when the user grips the handle 3 by the opposite hand or changes the direction of the hand similarly to the second embodiment. Thus, portability of the projector 1 improves.

Fourth Embodiment

Figure 6:
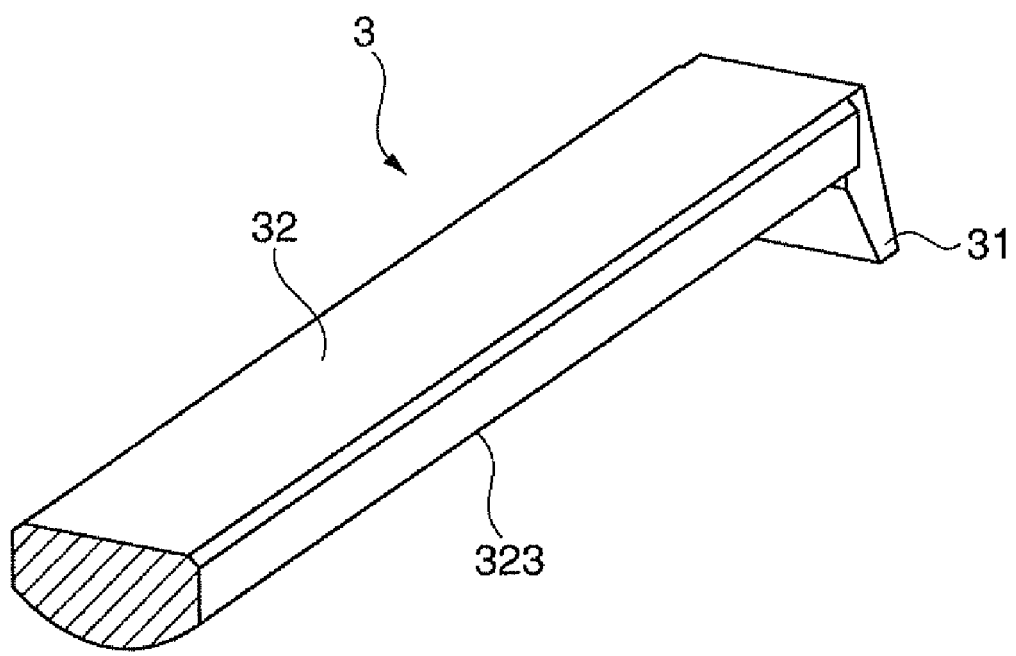
FIG. 6 is a perspective view of a handle according to a fourth embodiment of the invention.

FIG. 6 is a perspective view of the handle 3 as viewed from a cut surface of the handle 3 according to a fourth embodiment of the invention. In the following explanation with reference to the figure, similar reference numbers are given to elements similar to those in the first embodiment, and the same explanation is not repeated.

In this embodiment, a projected rim portion 323 having the center which forms roundly expanded in the quaquaversal and extending in the longitudinal direction of the grip member 32 is provided on the inner side of the grip member 32.

According to this embodiment, the user can fit the folded fingers along the projected rim portion 323. Thus, the user can grip the handle 3 in a stable condition.

Moreover, the user can put the fingers along the projected rim portion 323 provided in the longitudinal direction of the grip member 32 according to his or her preference even when the user grips the handle 3 by the opposite hand or changes the direction of the hand similarly to the second and third embodiments. Thus, portability of the projector 1 improves.

Fifth Embodiment

Figure 7:
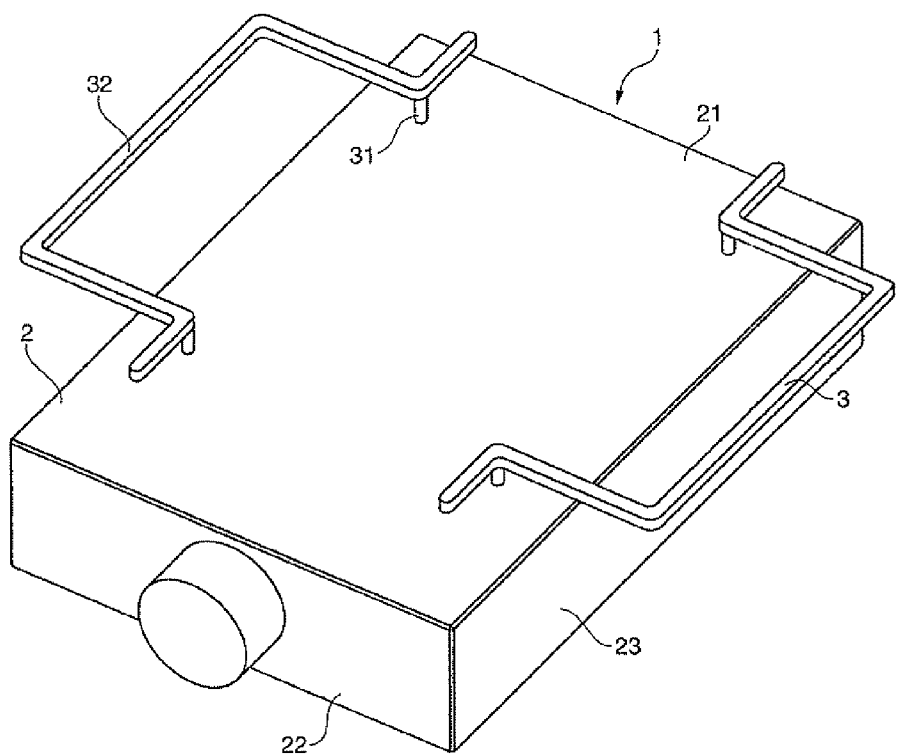
FIG. 7 is a perspective view of a projector according to a fifth embodiment of the invention.

FIG. 7 is a perspective view of the handle 3 according to a fifth embodiment of the invention. In the following explanation with reference to the figure, similar reference numbers are given to elements similar to those in the first embodiment, and the same explanation is not repeated.

In this embodiment, a part of the grip member 32 of the handle 3 is extruded from the side of the outer housing 2. Since the grip member 32 is expanded to the side, the concave portion 211 is not formed on the upper surface 21 of the outer housing 2.

According to this embodiment, the necessity for forming the concave portion 211 on the upper surface 21 of the outer housing 2 as in the first embodiment is eliminated. Thus, it is only required that the handle 3 having the grip member 32 partially extruded from the side is attached. Since a part of the grip member 32 is extruded from the side, the user can easily grip the handle 3. Thus, portability of the projector 1 improves.

Sixth Embodiment

Figure 8:
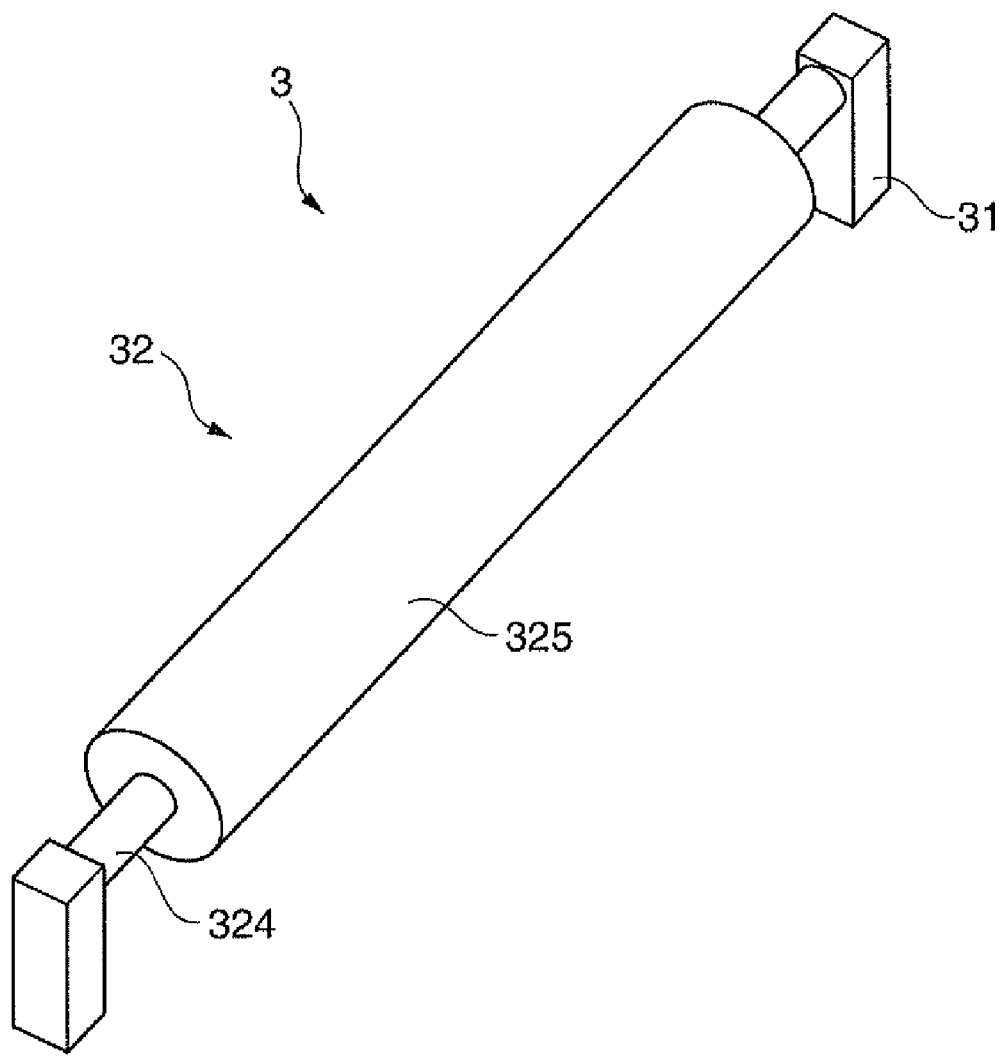
FIG. 8 is a perspective view of a handle according to a sixth embodiment of the invention.

FIG. 8 is a perspective view of the handle 3 according to a sixth embodiment of the invention. In the following explanation with reference to the figure, similar reference numbers are given to elements similar to those in the first embodiment, and the same explanation is not repeated.

In this embodiment, the grip member 32 has a cylindrical shaft 324, and a cylindrical grip member main body 325. The shaft 324 is inserted into the grip member main body 325 in the extending direction of the grip member main body 325, and the grip member main body 325 rotatably formed around the shaft 324.

According to this embodiment, the grip member main body 325 rotatably formed around the shaft 324. Thus, the user can rotate the grip member main body 325 at the time of attachment to the ceiling without switching the hand for gripping the handle 3 to the opposite hand or changing the direction of the hand. Thus, working efficiency improves.

The invention is not limited to the preferred structures and methods described herein. More specifically, the invention is not limited to the particular embodiments chiefly described and depicted herein. It is therefore intended that many modifications and changes in shapes, numbers, and other detailed structures may be made for the embodiments by those skilled in the art without departing technical spirit and scope of the invention.

Therefore, the description limiting the shapes and numbers herein should be considered as only examples for easy understanding of the invention. Accordingly, it is considered that description with names of parts from which a part or all of limitations in shapes and numbers are removed is included in the invention.

For example, the projections 321 curved in the direction away from each other in the second embodiment may be bended such that they come close to each other. In this structure, the user can similarly put the fingers along the bended projections, and thus grip the grip member 3 in a stable condition.

Figure 9:
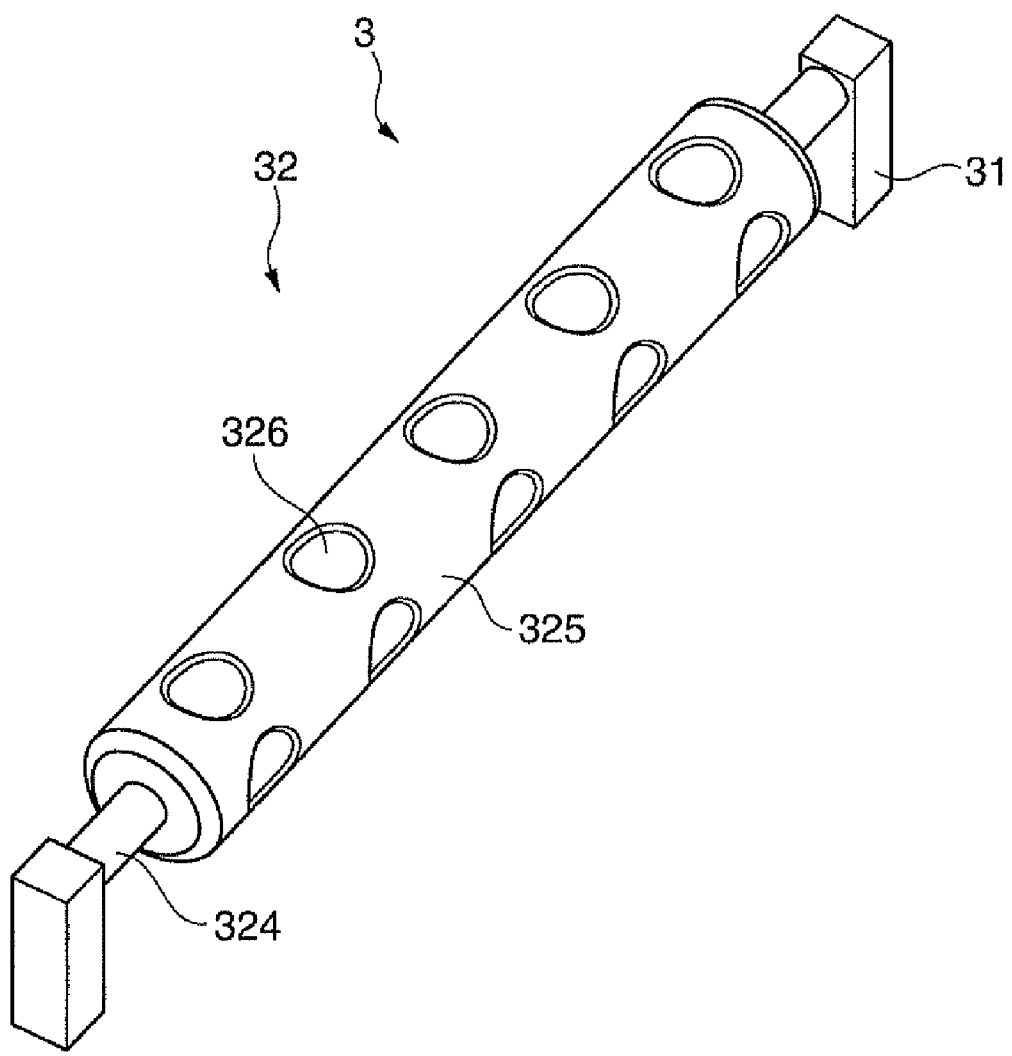
FIG. 9 is a perspective view of a handle according to a modified example of the invention.

While an asperity portion is not formed on the outer surface of the cylindrical grip member 32 in the sixth embodiment, a plurality of concaves 326 may be provided on the outer circumferential surface of the grip member 32 as illustrated in FIG. 9. In this structure, the user can put the fingers along the concaves 326 with higher fitting than in the structure including the simple cylindrical grip member 32. Thus, the user can grip the handle 3 in a stable condition.

Figure 10:
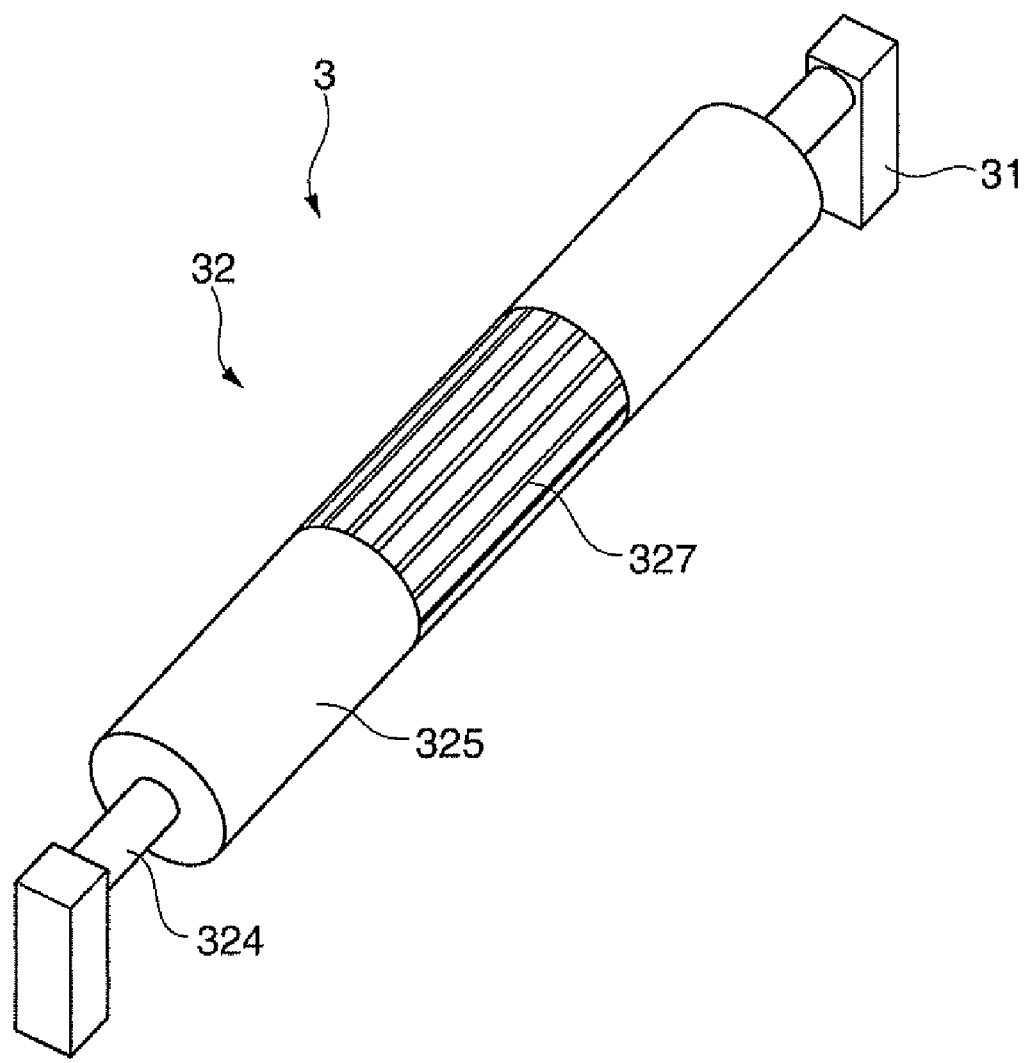
FIG. 10 is a perspective view of a handle according to another modified example of the invention.
Figure 11:
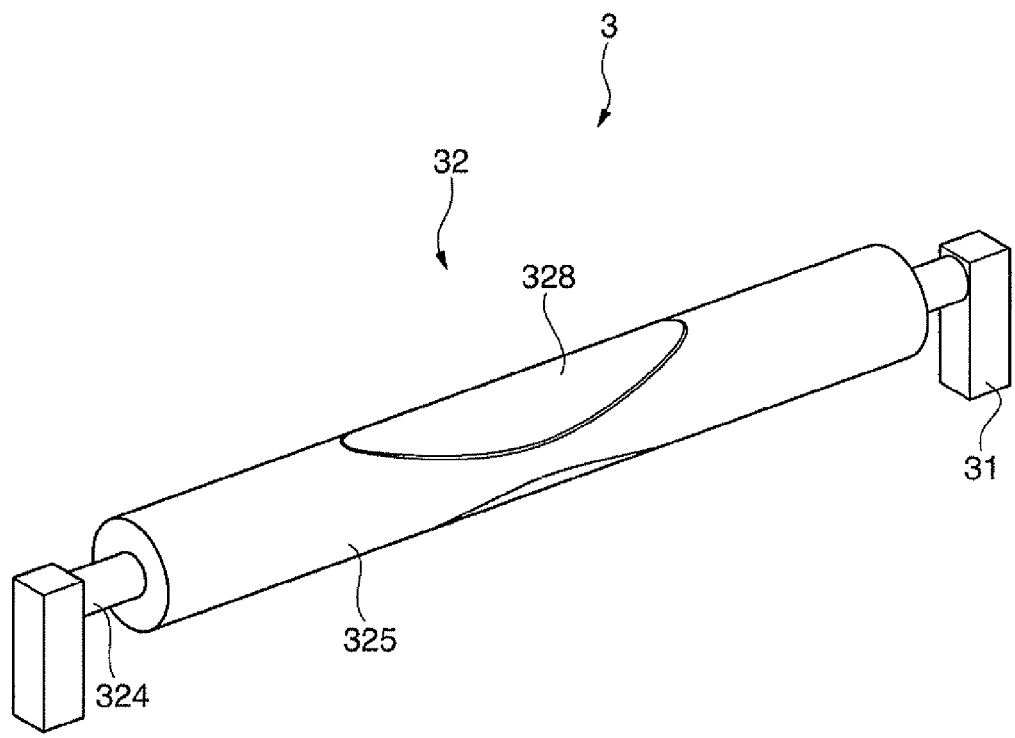
FIG. 11 is a perspective view of a handle according to a further modified example of the invention.

Alternatively, a stripe member 327 extending in the longitudinal direction of the grip member 32 in the stripe form may be provided in the vicinity of the center of the outer circumference of the grip member 32 as illustrated in FIG. 10. In this structure, the user can grip the stripe member 327 of the grip member 32. Thus, the user can grip the handle 3 in a stable condition without slipping.

Alternatively, a pair of elliptic rubber members 328 extending in the axial direction may be provided in the vicinity of the center of the outer circumference of the grip member 32. The rubber members 328 containing shock absorbing material deform along the shapes of the fingers when gripped by the fingers. In this structure, the user can grip the grip member 32 in a stable condition without slipping by deformation of the rubber members 328 along the shapes of the fingers. Since the rubber members 328 are not provided throughout the outer circumferential surface but only on a part of the surface, the user can grip a part of the grip member 32 other than the position of the rubber members 328 as well. According to this structure, a person having carried the projector 1 can smoothly pass the projector 1 to a person who attaches the projector 1 to the ceiling by slight slip of the grip member 32 at the time of suspension of the projector 1. Thus, attachment of the projector 1 can be smoothly performed.

While the projector 1 in the respective embodiments is a type projecting expanded images downward toward the front, the projector may be a type having lens shift function. This type of projector is installed on a desk or the like in the normal position while the upper surface 21 provided with the handles 3 is remaining on the upper side.

The technology of the invention capable of improving portability is applicable to a projector used for the purposes of presentation and home theater.

What is claimed is:

1. A projector, comprising:
   an outer housing; and
   a plurality of handles provided on an upper surface of the outer housing to hold the projector,
   wherein each of the handles includes
   a pair of attachment members standing on the upper surface, and
   a grip member connected with the pair of the attachment members and extended substantially in parallel with the upper surface.

2. The projector according to claim 1, wherein the plural handles are disposed substantially in parallel with each other.

3. The projector according to claim 1, wherein a pair of projections which project while curving in the longitudinal direction of the grip member are provided on the inner side of the grip member; and the pair of projections are curved in directions away from each other.

4. The projector according to claim 1, wherein an asperity portion which wavelikely processed in the longitudinal direction of the grip member is provided on the inner side of the grip member.

5. The projector according to claim 1, wherein a projected rim portion having the center which forms roundly expanded in the quaquaversal and extending in the longitudinal direction of the grip member is provided on the inner side of the grip member.

6. The projector according to claim 1, wherein a part of the grip member is extruded from the side of the outer housing.

7. The projector according to claim 1, wherein the grip member includes:
   a cylindrical shaft which extends in the extending direction of the grip member; and
   a grip member main body which rotatably formed around the shaft.

* * * * *